United States Patent [19]
Farrish

[11] 3,873,857
[45] Mar. 25, 1975

[54] TEMPERATURE SENSOR
[75] Inventor: Dean T. Farrish, Parker, Colo.
[73] Assignee: Sandoz Wander, Inc., Hanover, N.J.
[22] Filed: Jan. 10, 1974
[21] Appl. No.: 432,144

[52] U.S. Cl. ............................. 307/310, 73/362 SC
[51] Int. Cl. ........................................... H03k 17/00
[58] Field of Search ................ 73/362 SC; 307/310; 324/71 R; 219/510

[56] References Cited
UNITED STATES PATENTS
| | | | |
|---|---|---|---|
| 2,871,376 | 1/1959 | Kretzmer | 73/362 SC |
| 3,076,339 | 2/1963 | Barton | 73/362 SC |
| 3,219,843 | 11/1965 | Follett | 73/362 SC |

OTHER PUBLICATIONS
Felimban, A. A., Sandiford, D. J. "Transistors as Absolute Thermometers," Journ. Phys. E: Scientific Instruments Vol. 7, No. 5, May 1974, pp. 341–42.

*Primary Examiner*—Alfred E. Smith
*Assistant Examiner*—Rolf Hille
*Attorney, Agent, or Firm*—Gerald D. Sharkin; Robert S. Honor; Walter F. Jewell

[57] ABSTRACT

A temperature sensing circuit including a silicon transistor, and a differential amplifier connected to provide a constant current to the transistor, whereby the base-emitter voltage of the transistor varies linearly with its temperature at the rate of 2 mV/°C. The base electrode of the transistor forms the output of the differential amplifier and is applied through a voltage-level adjusting second differential amplifier to a third amplifier which divides the base-emitter voltage by two, thereby providing a millivolt voltage reading measurable directly in °C. A switching device is provided to couple the output of the third amplifier directly to a meter, or to a conversion circuit which provides an output reading in °F. The conversion circuit includes a fourth amplifier which multiplies the third amplifier output by 9/5, and a fifth amplifier which adds a voltage equivalent to 32° to the output voltage from the fourth amplifier.

5 Claims, 1 Drawing Figure

PATENTED MAR 25 1975　　　　　　　　　　　　　　　　　3,873,857
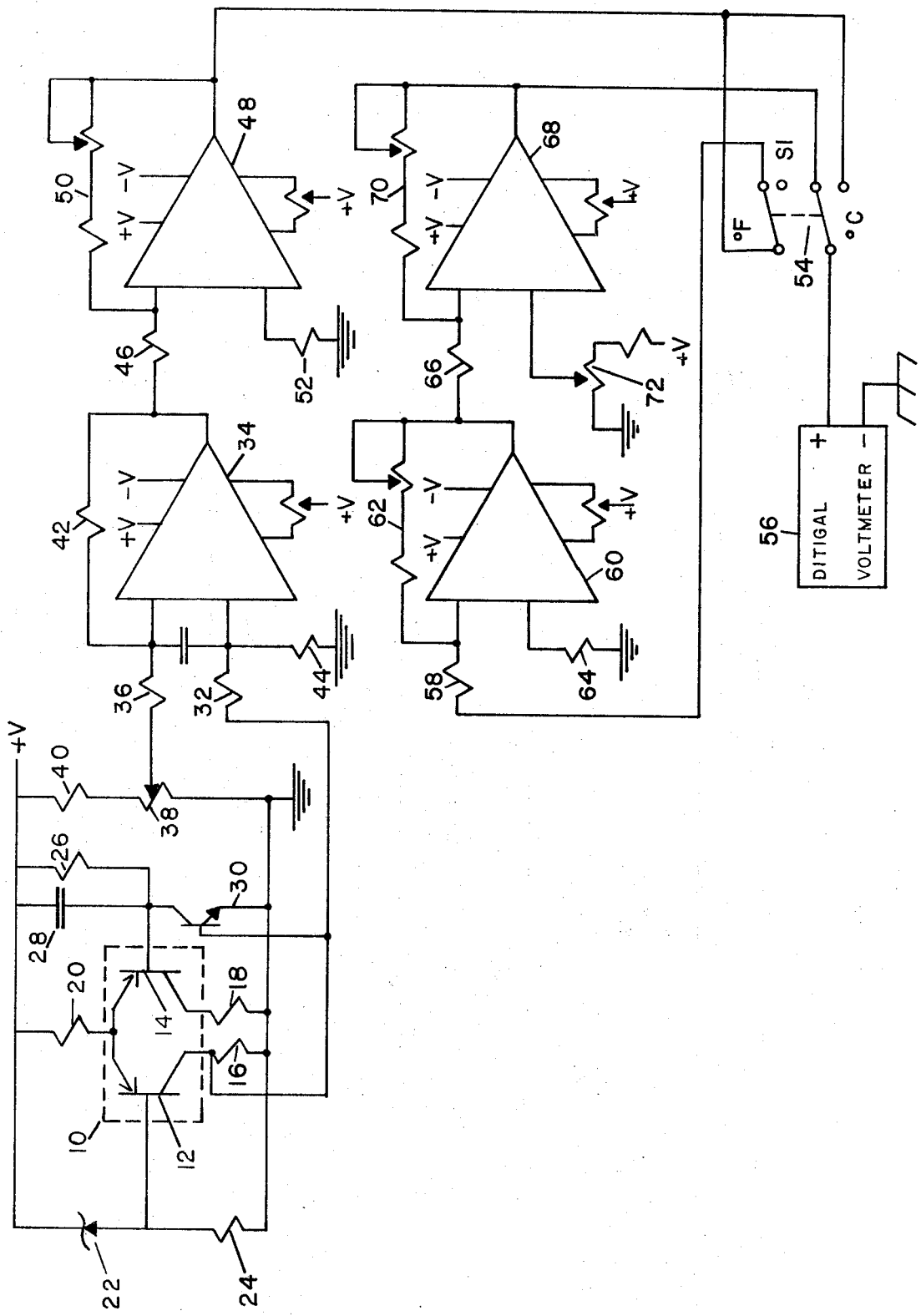

3,873,857

TEMPERATURE SENSOR

BACKGROUND OF THE DISCLOSURE

A well known phenomenon of the operation of silicon transistors, is that the base-emitter voltages thereof vary linearly with temperature changes, at the rate of 2 mV/°C, when the collector currents of the transistors are maintained at a constant value. In the present invention a novel circuit is provided for maintaining such a constant collector current, and the base-emitter voltage of the silicon transistor is processed to selectively provide direct temperature readings in °C or °F. An important advantage of utilizing such a transistor as a temperature sensor, is that it withdraws very little heat from the object being monitored, and is therefore highly useful in measuring the temperature of small electronics components as well as many other objects.

SUMMARY OF THE INVENTION

In accordance with the present invention there is provided a silicon transistor having its principal conducting electrodes connected in an input circuit at one side of a differential amplifier. The output of the other side of the differential amplifier is connected to the control electrode of the transistor in a manner wherein the collector current ($I_c$) of the transistor is maintained at a constant value over a predetermined temperature range. A constant voltage element is connected to the input circuit of said other side of the differential amplifier, and the output of that other side is utilized as the output signal for the sensing circuit, as well as providing the bias voltage for the silicon transistor.

Particularly, in a preferred embodiment, a bridge-like circuit is provided having a zener diode and a resistor connected in series at one side, and a resistor and the silicon transistor connected in series with each other, and in parallel with the first-mentioned series circuit. Then, a differential amplifier circuit is connected in parallel with both of the above-mentioned series circuits. The differential amplifier comprises a pair of transistors having their base electrodes connected respectively to the junctions between the elements of the two series circuits, and the output of the differential amplifier transistor having the zener diode connected to its input is connected to the base electrode of the silicon transistor.

The emitter of the silicon transistor is grounded, so that the voltage at the base provides the output signal proportional to changes in temperature. That output signal is coupled as one input to a unity gain second differential amplifier, having its other input coupled to a reference voltage so that the output of the second differential amplifier provides a desired voltage which crosses through the zero level when the temperature of the silicon transistor crosses through 0°C.

The output of the second differential amplifier is applied to a third amplifier having a gain of 0.5 so that the 2 mV/°C output from the silicon transistor is converted to 1 mV/°C, for application to a digital voltmeter. Thus, a reading in millivolts on the voltmeter corresponds exactly to the temperature in °C of the silicon transistor. The output from the third amplifier is coupled to the meter through a switching circuit which selectively provides an alternate path through two additional amplifiers which multiply the output from the third amplifier by 9/5, and add 32 millivolts to that value, respectively, in order to provide an output reading in °F.

BRIEF DESCRIPTION OF THE DRAWING

A preferred embodiment of the invention is illustrated in schematic form in the accompanying drawing.

DETAILED DESCRIPTION OF THE PREFERRED EMBODIMENT

In a preferred embodiment of the invention, as illustrated in the drawing, there is provided a first differential amplifier 10, including a pair of PNP transistors 12 and 14 having their emitters connected together, and having their collectors connected through respective resistors 16 and 18 to a point of ground potential. The junction of the emitters is connected through a resistor 20 to a point of positive potential, and separate input circuits are provided for the base electrodes of the transistors 12 and 14. One of the base electrodes input circuits includes a zener diode 22 connected in series combination with a resistor 24, wherein the series combination is connected from the positive source potential to ground. The junction of the resistor 24 and the diode 22 is connected to the base electrode of the transistor 12 to provide a constant reference voltage at that base electrode. The other input circuit to the differential amplifier is constituted by a resistor 26 connected in parallel with a capacitor 28, and that parallel combination is connected in series with the principal conducting electrodes of a silicon NPN transistor 30 having its emitter connected to ground, and its collector connected to one end of the parallel resistor-capacitor combination. The other end of that parallel combination is connected to the source of positive potential. The junction between the collector of transistor 30 and resistor 26 is connected to the base of transistor 14. The junction between the collector of transistor 12 and resistor 16 provides the output for the circuit, and that junction is also connected to the base electrode of the transistor 30 to complete the circuit for temperature sensing portion of the device.

In operation, the zener diode 22 presents a fixed reference voltage to he base electrode of the transistor 21. Also, the cases of transistors 12 and 14 are maintained in mechanical contact so that their temperatures are equal and so that the voltage at the base of transistor 14 tracks the corresponding voltage at the base of transistor 12 as their temperatures vary. Furthermore, as the base-emitter voltage of the transistor 30 varies with temperature, the load seen by the transistor 12 also varies, thus causing the differential amplifier to alter the base current in the transistor 14, so that the collector current in the transistor 30 is maintained at a constant value.

As stated above, the base-emitter voltage of the transistor 30 varies linearly with temperature at the rate of 2 millivolts per degree Centigrade, and this voltage is applied through a resistor 32 to one input of a unity gain differential amplifier 34. The second input of the amplifier 34 is coupled through a resistor 36 from an adjustable resistor 38 connected in series combination with a fixed resistor 40, wherein that series combination is connected between the positive potential source and the point of ground potential. The unity gain amplifier 34 is completed by a feedback resistor 42 connected between the output and the second input terminal, and an additional resistor 44, serving as a voltage divider, is connected from the first input to ground.

In operation, the unity gain amplifier 34 provides a zero volt output when the transistor 30 is at 0°C, and this reference level is preset by means of the adjustable resistor 38.

The output of the amplifier 34 is coupled through a resistor 46 to one input of an amplifier 48 having a gain of 0.5, so that the output of that amplifier 48 provides a voltage which varies one millivolt per degree Centigrade with temperature variations of the transistor 30. Also, a variable resistance feedback path 50 is provided between the output and the above-mentioned input to the amplifier 48, while the other input to the amplifier 48 is coupled to ground through a resistor 52.

The output of the amplifier 48 is coupled through a switching device 54 to a digital voltmeter 56, so that when the switching device 54 is in the °C position, the one millivolt per degree C output from amplifier 48 is applied directly to the voltmeter so that its output reading in millivolts corresponds exactly to the temperature of the transistor 30 in °C. Then, when the switch 54 is placed in its °F position, the output from the amplifier 48 is coupled through signal-conversion circuitry prior to being applied to the voltmeter 56, wherein that circuitry converts the voltage level to a level corresponding to degrees F. In particular, when the temperature is to be read in degrees F., the output of the amplifier 48 is applied through the switch 54 and through a resistor 58 to an amplifier 60 having a gain of 9/5, and that amplifier 60 also has a feedback path 62 and a fixed resistor 64 connected from its other input to ground. Then, the output from the amplifier 60 is coupled through a fixed resistor 66 to one input of a final amplifier 68 which adds a voltage equivalent to 32° to the output value of the amplifier 60. In this case, the amplifier 68 also has an adjustable resistance feedback 70, and it has its other input connected to a variable resistance voltage divider 72. The output from the amplifier 68 is connected to the switch 54 for application to the voltmeter 56 which will thereby present an output in millivolts corresponding to 1mV/°F of temperature of the transistor 30.

Specific values and designations of the elements in the first differential amplifier, which may be used, are as follows:

| | |
|---|---|
| Transistors 12 and 14 | 2N3906 |
| Resistors 16 and 18 | 220Ω |
| Resistors 20 and 24 | 1KΩ |
| Diode 22 | 1N4735A |
| Resistor 26 | 4.75KΩ |
| Capacitor 28 | 10μf |
| Transistor 30 | 2N2222. |

In summary it is seen that the invention disclosed herein provides a highly useful temperature sensor capable of providing an accurate temperature reading without affecting the heat content of the object being monitored.

What is claimed is:

1. A solid state temperature sensor comprising a silicon transistor having emitter, base, and collector electrodes, and a first differential amplifier circuit connected to said transistor for supplying a constant collector current thereto, said differential amplifier having a first active element provided with input and output terminals, and having reference voltage means connected to said first input terminal, and a second active element provided with second input and output terminals, a series circuit comprising a fixed resistor connected with said collector and emitter electrodes, said series circuit being connected across a source of potential and having the junction between said fixed resistor and said transistor connected to said second input terminal, and said first output terminal being coupled to the base electrode of said silicon transistor, wherein the base-emitter voltage of said transistor, at said first output terminal, varies at the rate of 2mV/°C of the temperature of said silicon transistor while the collector current of said silicon transistor is maintained at a constant value by said differential amplifier.

2. A solid state temperature sensor as set forth in claim 1 further comprising first conversion circuit means for controlling the reference level of said base-emitter voltage output from said first output terminal, and for dividing said voltage by a factor of 0.5 to provide a signal which varies at the rate of 1mV/°C.

3. A solid state temperature sensor as set forth in claim 2 wherein said first conversion circuit means comprises a second differential amplifier circuit having first and second inputs and an output, wherein said first input is connected to said first output terminal of said first differential amplifier, and said second input is adapted to be coupled to an adjustable reference potential, whereby said base-emitter voltage of said silicon transistor is coupled to said output of said second differential amplifier at a selected reference level; and a third amplifier having an input and an output, having a gain of 0.5, and having its input connected to the output of said second differential amplifier, whereby said 1mV/°C signal is provided at said output of said third amplifier.

4. A solid state temperature sensor as set forth in claim 2 further comprising second conversion circuit means for converting said 1 mV/°C signal to a signal of 1mV/°F.

5. A solid state temperature sensor as set forth in claim 4 wherein said first conversion circuit means comprises a second differential amplifier circuit having first and second inputs and an output, wherein said first input is connected to said first output terminal of said first differential amplifier, and said second input is adapted to be coupled to an adjustable reference potential, whereby said base-emitter voltage of said silicon transistor is coupled to said output of said second differential amplifier at a selected reference level, and a third amplifier having an input and an output, having a gain of 0.5, and having its input connected to the output of said second differential amplifier, whereby said 1mV/°C signal is provided at said output of said third amplifier; and said second conversion circuit means comprises a fourth amplifier having a gain of 9/5, and having an input connected to the output of said third amplifier, and output amplifying means having an input coupled to the output of said fourth amplifier for adding 32mV to the output voltage from said fourth amplifier, wherein the output from said output amplifying means corresponds to 1mV/°F of the temperature of said silicon transistor.

* * * * *